US011539761B2

(12) United States Patent
Hegarty et al.

(10) Patent No.: US 11,539,761 B2
(45) Date of Patent: Dec. 27, 2022

(54) IMS NODE AND METHOD PERFORMED THEREIN

(71) Applicant: Telefonaktiebolaget LM Ericsson (publ), Stockholm (SE)

(72) Inventors: Charles Hegarty, Bromma (SE); Timo Forsman, Sollentuna (SE); Mats Ola Stille, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/312,648

(22) PCT Filed: Dec. 10, 2018

(86) PCT No.: PCT/SE2018/051269
§ 371 (c)(1),
(2) Date: Jun. 10, 2021

(87) PCT Pub. No.: WO2020/122774
PCT Pub. Date: Jun. 18, 2020

(65) Prior Publication Data
US 2022/0053034 A1     Feb. 17, 2022

(51) Int. Cl.
*G06F 15/16*     (2006.01)
*H04L 65/1073*   (2022.01)
(Continued)

(52) U.S. Cl.
CPC ...... *H04L 65/1073* (2013.01); *H04L 41/5051* (2013.01); *H04L 65/1016* (2013.01)

(58) Field of Classification Search
CPC ............. H04L 65/1073; H04L 41/5051; H04L 65/1016
(Continued)

(56) References Cited

U.S. PATENT DOCUMENTS

2011/0194459 A1\* 8/2011 Belinchon Vergara ...................... H04L 65/1073
370/254
2017/0318450 A1\* 11/2017 Salkintzis ............. H04W 60/04
(Continued)

FOREIGN PATENT DOCUMENTS

WO     2017140340 A1     8/2017

OTHER PUBLICATIONS

Author Unknown, "Technical Specification Group Services and System Aspects; Study on Enhancements to IMS for new real time communication Services; Stage 1 (Release 16)," Technical Report 22.823, Version 16.1.0, 3GPP Organizational Partners, Jun. 2018, 19 pages.
(Continued)

*Primary Examiner* — Lan Dai T Truong
(74) *Attorney, Agent, or Firm* — Withrow & Terranova, PLLC

(57) ABSTRACT

Embodiments herein relate to a method performed by an IMS node for handling data of a UE, in a communication network, wherein the communication network comprises partitioned sets of functionalities of one or more core networks wherein each set of functionalities belongs to a network slice. The IMS node receives, from the UE, a message for registering the UE to the IMS node, wherein the message comprises a slice indication indicating a network slice identity and a UE indication identifying the UE. The IMS node stores a registration of the UE in the IMS node, in addition to a previously stored registration of the UE, with the proviso that the indicated network slice identity differs from a previous network slice identity of the previously stored registration of the UE and thereby allowing parallel active communications using the registration and the previously stored registration.

12 Claims, 9 Drawing Sheets

(51) Int. Cl.
*H04L 41/5051* (2022.01)
*H04L 65/1016* (2022.01)

(58) Field of Classification Search
USPC .............................. 709/227, 220, 222, 249
See application file for complete search history.

(56) References Cited

U.S. PATENT DOCUMENTS

2019/0053147 A1* 2/2019 Qiao ................. H04M 15/8038
2020/0128445 A1* 4/2020 Dong ...................... H04L 47/78

OTHER PUBLICATIONS

Author Unknown, "Technical Specification Group Services and System Aspects; Service aspects and requirements for network sharing (Release 13)," Technical Report 22.951, Version 13.0.0, 3GPP Organizational Partners, Dec. 2015, 19 pages.

Author Unknown, "Technical Specification Group Services and System Aspects; Study on Enhanced IMS to 5GC Integration (Release 16)," Technical Report 23.794, Version 0.4.0, 3GPP Organizational Partners, Jun. 2018, 65 pages.

Author Unknown, "Technical Specification Group Services and System Aspects; Network Sharing; Architecture and functional description (Release 13)," Technical Specification 23.251, Version 13.0.0, 3GPP Organizational Partners, Dec. 2014, 39 pages.

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," Technical Specification 36.300, Version 13.1.0, 3GPP Organizational Partners, Sep. 2015, 254 pages.

Jennings, Cullen, et al., "Managing Client-Initiated Connections in the Session Initiation Protocol (SIP)," Network Working Group, Request for Comments: 5626, IETF Trust, Oct. 2009, 50 pages.

NTT DOCOMO, "S2-161043: Solution to support a UE with simultaneous connections to multiple Network Slices," Third Generation Partnership Project (3GPP), SA WG2 Meeting #113AH, Feb. 23-26, 2016, 4 pages, Sophia Antipolis, France.

ZTE, "S2-182165: Solution for key issue 3: Network Slicing and IMS," Third Generation Partnership Project (3GPP), SA WG2 Meeting #126, Feb. 26-Mar. 2, 2018, 3 pages, Montreal, Canada.

International Search Report and Written Opinion for International Patent Application No. PCT/SE2018/051269, dated Feb. 20, 2019, 11 pages.

* cited by examiner

IMS NODE AND METHOD PERFORMED THEREIN

This application is a 35 U.S.C. § 371 national phase filing of International Application No. PCT/SE2018/051269, filed Dec. 10, 2018, the disclosure of which is incorporated herein by reference in its entirety.

TECHNICAL FIELD

Embodiments herein relate to an IMS node and method performed therein for communication. Furthermore, a computer program and a computer readable storage medium are also provided herein. In particular, embodiments herein relate to communicating within a communication network.

BACKGROUND

In a typical communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, with each service area or cell area being served by a radio network node such as a radio access node e.g., a Wi-Fi access point or a radio base station (RBS), which in some networks may also be denoted, for example, a NodeB, an eNodeB", or a gNodeB. A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipment. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. FIG. 1 shows the overall E-UTRAN architecture and is further defined in for example 3GPP TS 36.300 v.13.1.0. The E-UTRAN comprises eNBs, providing a user plane comprising the protocol layers Packet Data Convergence Protocol (PDCP)/Radio Link Control (RLC)/Medium Access Control (MAC)/Physical layer (PHY), and a control plane comprising Radio Resource Control (RRC) protocol in addition to the user plane protocols towards the wireless device. The radio network nodes are interconnected with each other by means of the X2 interface. The radio network nodes are also connected by means of the S1 interface to the EPC, more specifically to the MME by means of an S1-MME interface and to the S-GW by means of an S1-U interface.

The wireless communication industry is at the verge of a unique business crossroads. The growing gap between capacity and demand is an urgent call for new approaches and alternative network technologies to enable mobile operators to achieve more with less. Today, mobile broadband data is growing at an annual rate of 40-50 percent per year in the U.S. and other regions globally. Mobile service providers address these rapidly expanding traffic volumes through deployment of additional network functions, which will be a significant capital expenditure (CAPEX) challenge. The nature of the mobile broadband data traffic is also evolving with new services including new video applications, connected cars and the Internet of Things (IoT). This rapid capacity growth and increasing traffic diversity in LTE networks stresses the assumptions of existing network architectures and operational paradigms.

Network Functions Virtualization (NFV) provides a new path that can increase the flexibility required by mobile service providers and network operators to adapt and accommodate this dynamic market environment. NFV is a new operational approach applying well-known virtualization technologies to create a physical Commercial Off-the-Shelf (COTS) distributed platform for the delivery of end-to-end services in the context of the demanding environment of telecom network infrastructure and applications.

Because EPC is critical to the realization and management of all LTE traffic, it is important to consider use cases related to virtualization of the EPC elements. Each individual EPC element also has specific considerations that determine whether to deploy with NFV. Virtualized EPC (vEPC) is a good example: Multiple virtualized network functions (VNF) can be deployed and managed on a Network Functions Virtualization Infrastructure (NFVI) but must cater to performance scalability in both signaling/control plane and user plane, each potentially demanding different levels of NFVI resources.

vEPC elements can benefit from more agile deployment and scalability. However, virtual resource monitoring and orchestration, along with service awareness, are essential for implementing elasticity effectively. Due to the nature of telecom networks, service Level Agreements (SLA) will be a key issue for a virtualized mobile core network. Because virtualization usually leads to a performance trade-off, equipment vendors must optimize data-plane processing to satisfy carrier-grade bandwidth and latency requirements and sufficient control-plane performance for SLAs needed to ensure availability of regulatory services, such as emergency calls.

VNF is a virtualized network function which serves as a VNF Software for providing virtual network capabilities. A VNF could be decomposed and instantiated in roles such as Virtualized MME (vMME), Virtualized PCRF (vPCRF), Virtualized SGW (vSGVV) or Virtualized PDN-GW (vPDN-GW).

NFV is seen as an enabler for network slicing that is described herein.

When looking at the wide range of applications and use cases that are addressed with a 5G network, it is quite obvious these cannot effectively be addressed with a traditional approach of having a purpose built network for each application. This will lead to high cost for networks and devices as well as inefficient use of valuable frequency resources. An operator may have one physical network infrastructure and one pool of frequency bands, which may support many separate virtualized networks, also called network slices. Each network slice may have unique characteristics for meeting the specific requirements of the use case/s it serves.

A key function of 5G Core network is to allow for flexibility in network service creation, making use of different network functions suitable for the offered service in a specific network slice, e.g. Evolved Mobile Broadband (MBB), Massive Machine Type Communication (MTC), Critical MTC, Enterprise, etc.

In addition to Service optimized networks there are more drivers for Network slicing, such as;

Business expansion by low initial investment: Given the physical infrastructure it is much easier to instantiate another Packet Core instance for the business expansion than to set up a new parallel infrastructure or even integrated nodes Low risk by no/limited impact on legacy: As the new instance is logically separated from the other network slices, the network slices can also provide resource isolation between each other. Thus introduction of a new isolated network slice will not impact the existing operator services and therefore only provide low risk Short Time To Market (TTM): The operators are concerned about the time it takes to set up the network for a new service. Slicing of the network for different services/operator use cases provides a separation of concern that can result in a faster setup of a network slice for a certain service as it is separately managed and with limited impact on other network slices Optimized use of resources: Today the network is supporting many different services but with new use cases and more diverging requirements there is a need for optimizing the network for the specific type use case. Network slicing allows to match services to optimized network instances, and it also allows for a more optimized use of those specific resources Allows for individual network statistics: With service specific network slices and possibly even on the level of individual enterprises, there is a possibility of collecting network statistics specific for a limited and well defined group of users of the network slice. This is not the key driver for slicing but rather a benefit that may be a useful tool Slicing can also be used to isolate different services in an operator's network. Future networks are expected to support new use cases going beyond the basic support for voice services and mobile broadband currently supported by existing cellular network, e.g. 2G/3G/4G. Some example use cases include:

Evolution of MBB
   Evolved communication services
   Cloud services
   Extended mobility and coverage
Mission critical Machine Type Communication
   Intelligent traffic systems
   Smart grid
   Industrial applications
Massive Machine Type Communication
   Sensors/actuators
   Capillary networks
Media
   Efficient on-demand media delivery
   Media awareness
   Efficient support for broadcast services These use cases are expected to have different performance requirements, e.g. bit-rates, latencies, as well as other network requirements, e.g. mobility, availability, security etc., affecting the network architecture and protocols.

Supporting these use cases could also mean that new players and business relations are needed compared to existing cellular networks. For instance it is expected that future networks should address the needs of Enterprise services
Government services, e.g. national and/or public safety
Verticals industries, e.g. automation, transportation
Residential users These different users and services are also expected to put new requirements on the network. FIG. 2 shows an example of a network slicing for a case when there exists different network slices in the core network for MBB, Massive MTC and Critical MTC. In other words, the network slices may comprise separate core network instances supporting the different network slices.

Network slicing introduces the possibility that the network slices are used for different services and use cases and there is a need to enable usage of this mechanism for wireless devices in the communication network to improve the performance of the communication network. Thus, Network slicing consists of defining, realizing and operating end-to-end logical networks by means of dedicated and/or shared resources in the Core Network and/or the Radio Access Network and associated management system(s). Network slicing is about creating logically separated partitions of the network, addressing different business purposes. These "network slices" are logically separated to a degree that they can be regarded and managed as networks of their own.

The network slicing applies to both LTE based networks and 5G Radio Access Technology (RAT) and to any other RATs as well. The network slicing supports business expansion, i.e. improving the cellular operator's ability to serve other industries, e.g., by offering connectivity services with different network characteristics, such as performance, security, robustness, and complexity. One shared Radio Access Network (RAN) infrastructure, comprising one or more RANs, connects to several Evolved Packet Core (EPC) instances, e.g. one EPC instance per network slice. As the EPC functions are being virtualized, it is assumed that the operator shall instantiate a new Core Network (CN) when a new slice should be supported. This architecture is shown in FIG. 3. Slice 0 can for example be a Mobile Broadband slice and Slice 1 can for example be a Machine Type Communication network slice.

The existing network slicing mechanisms of 3GPP release 15, enables a mobile network operator to spread their subscribers over different 5G core (5GC) networks. Home subscribers may get their own slice, a mobile virtual network operator (MVNO) may get their own slice, and a huge car rental company customer may get their own slice as well.

3GPP, e.g. TR 22.823, are discussing the concept of spreading traffic of a single wireless device across different 5GC slices, wherein the wireless device is represented by a single IP multimedia private identity (IMPI), international mobile subscriber identity (IMSI) and/or IP multimedia public identity (IMPU). One way could be that real-time sensitive IP multimedia system (IMS) service traffic like voice shall traverse a specific 5GC slice, whilst more latency relaxed IMS traffic like messaging, shall traverse another 5GC slice. There are many possible combinations, e.g. telephony in one slice and low latency requiring mission critical push to talk (MCPTT) traffic over another. Both handled by one and the same IMS network.

A problem with the existing 3GPP IMS technology is that only one active authentication based IMS registration, IMS registration for short, such as Authentication and Key Agreement (AKA) authentication, at a time is used for a wireless device with a given private identity, such as an IMSI or IMS IMPI, leading to a rather rigid solution.

SUMMARY

An object of embodiments herein is to provide a mechanism for improving performance of the communication network in an efficient manner.

According to an aspect of embodiments herein the object may be achieved by a method performed by an IMS node for handling data of a UE in a communication network. The communication network comprises partitioned sets of functionalities of one or more core networks wherein each set of functionalities belongs to a network slice. The IMS node receives a message for registering the UE to an IMS of the IMS node, wherein the message comprises a slice indication indicating a network slice identity and a UE indication identifying the UE. The IMS node stores a registration of the UE in the IMS, in addition to a previously stored registration of the UE, with the proviso that the indicated network slice identity differs from a previous network slice identity of the previously stored registration of the UE and thereby allowing parallel active communications using the registration and the previously stored registration.

According to another aspect of embodiments herein, the object is achieved by providing an IMS node for handling data of a UE in a communication network. The communication network comprises partitioned sets of functionalities of one or more core networks wherein each set of functionalities belongs to a network slice. The IMS node is configured to receive a message for registering the UE to the IMS node. The message comprises a slice indication indicating a network slice identity and a UE indication identifying the UE. The IMS node is further configured to store a registration of the UE in the IMS node, in addition to a previously stored registration of the UE, with the proviso that the indicated network slice identity differs from a previous network slice identity of the previously stored registration of the UE and thereby allowing parallel active communications using the registration and the previously stored registration.

It is furthermore provided herein a computer program comprising instructions, which, when executed on at least one processor, cause the at least one processor to carry out any of the methods above, as performed by the IMS node.

It is additionally provided herein a computer-readable storage medium, having stored thereon a computer program comprising instructions which, when executed on at least one processor, cause the at least one processor to carry out the method above, as performed by the IMS node.

Since only one active IMS registration at a time is used for a UE, a consequence is that presently a new IMS registration, with same IMPI and that is AKA authentication based, overwrites the previous one. There have been initiatives to support a standby IMS registration to one active IMS registration, but there is no support for two or more active IMS registrations. If an operator has an IMS network and wants a user's UE to register different IMS services over different 5GC slices, the UE makes at least two IMS registrations and embodiments herein ensure that the second IMS registration issued does not overwrite the first IMS registration. Embodiments herein introduce an efficient manner of enabling usage of a sliced core network structuring by introducing additional actions during registration of the UE. By determining to enable two or more active IMS registrations based on whether the network slice ID is different than an already active IMS registration for a certain UE, embodiments herein thus enable the UE to have many IMS services registered simultaneously in parallel over different 5G packet core network slices leading to an improved performance of the wireless communication network.

BRIEF DESCRIPTION OF THE DRAWINGS

Embodiments will now be described in more detail in relation to the enclosed drawings, in which.

DETAILED DESCRIPTION

Network sharing is described in 3GPP TR 22.951 version 13.0.0 and 3GPP TS 23.251 version 13.0.0. Network sharing is a way for operators to share the heavy deployment costs for mobile networks, especially in the roll-out phase. In the current mobile telephony marketplace, functionality that enables various forms of network sharing is becoming more and more important.

A network sharing architecture shall allow different core network operators to connect to a shared radio access network. The operators do not only share the radio network elements, but may also share the radio resources themselves.

In addition to this shared radio access network the operators may or may not have additional dedicated radio access networks.

Figure 1:
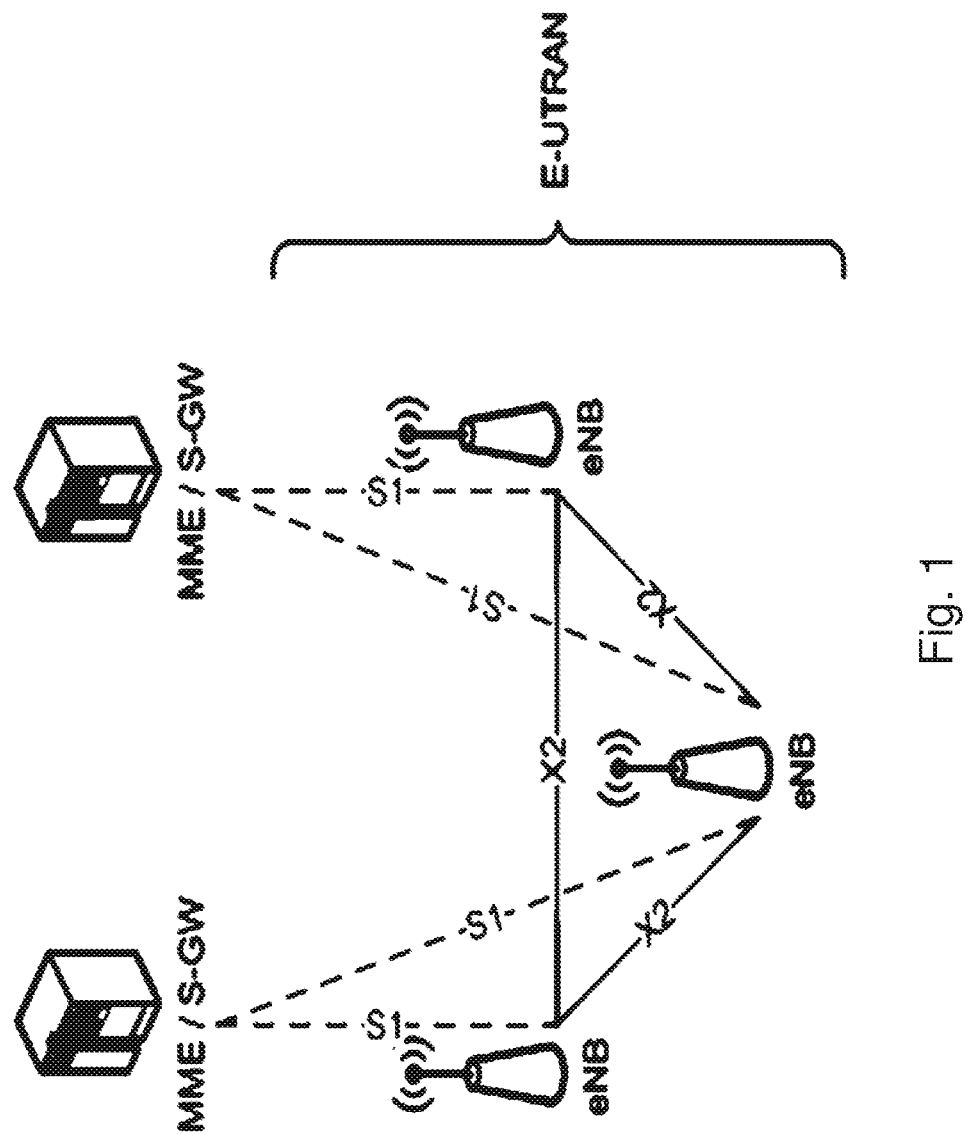
FIG. 1 is a schematic overview depicting a radio access network in connection with a core network.
Figure 2:
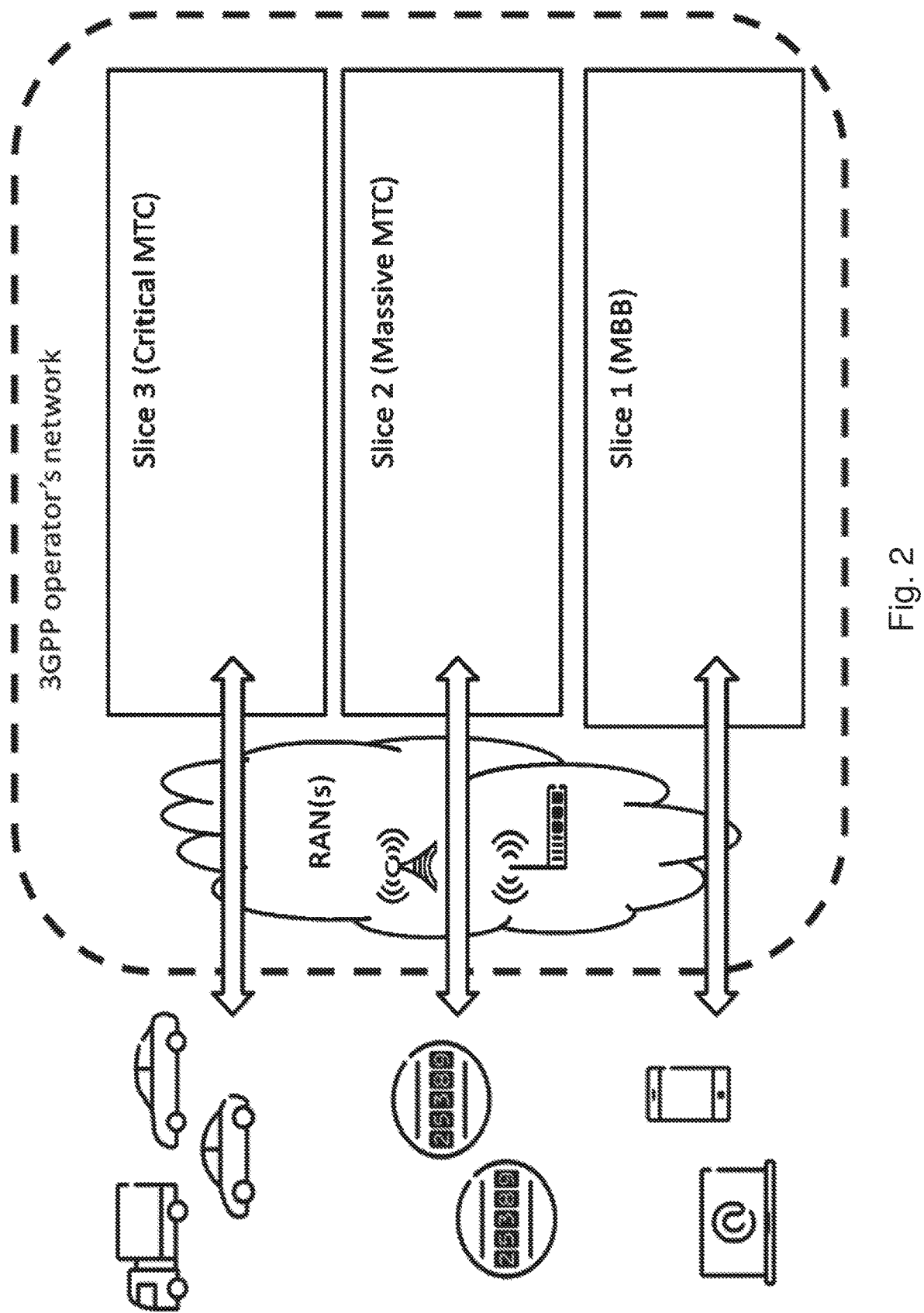
FIG. 2 is a schematic overview depicting an example of a slicing of a core network according to prior art.
Figure 3:
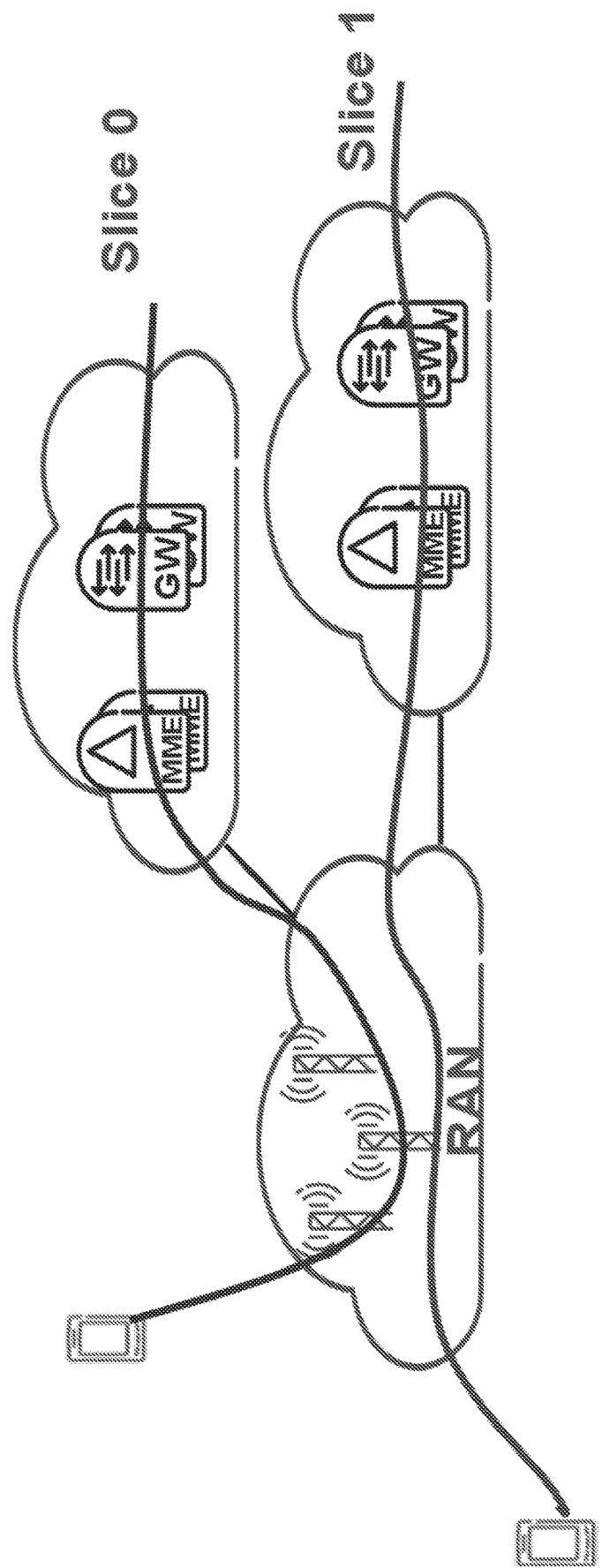
FIG. 3 is a schematic overview depicting network slicing.
Figure 4:
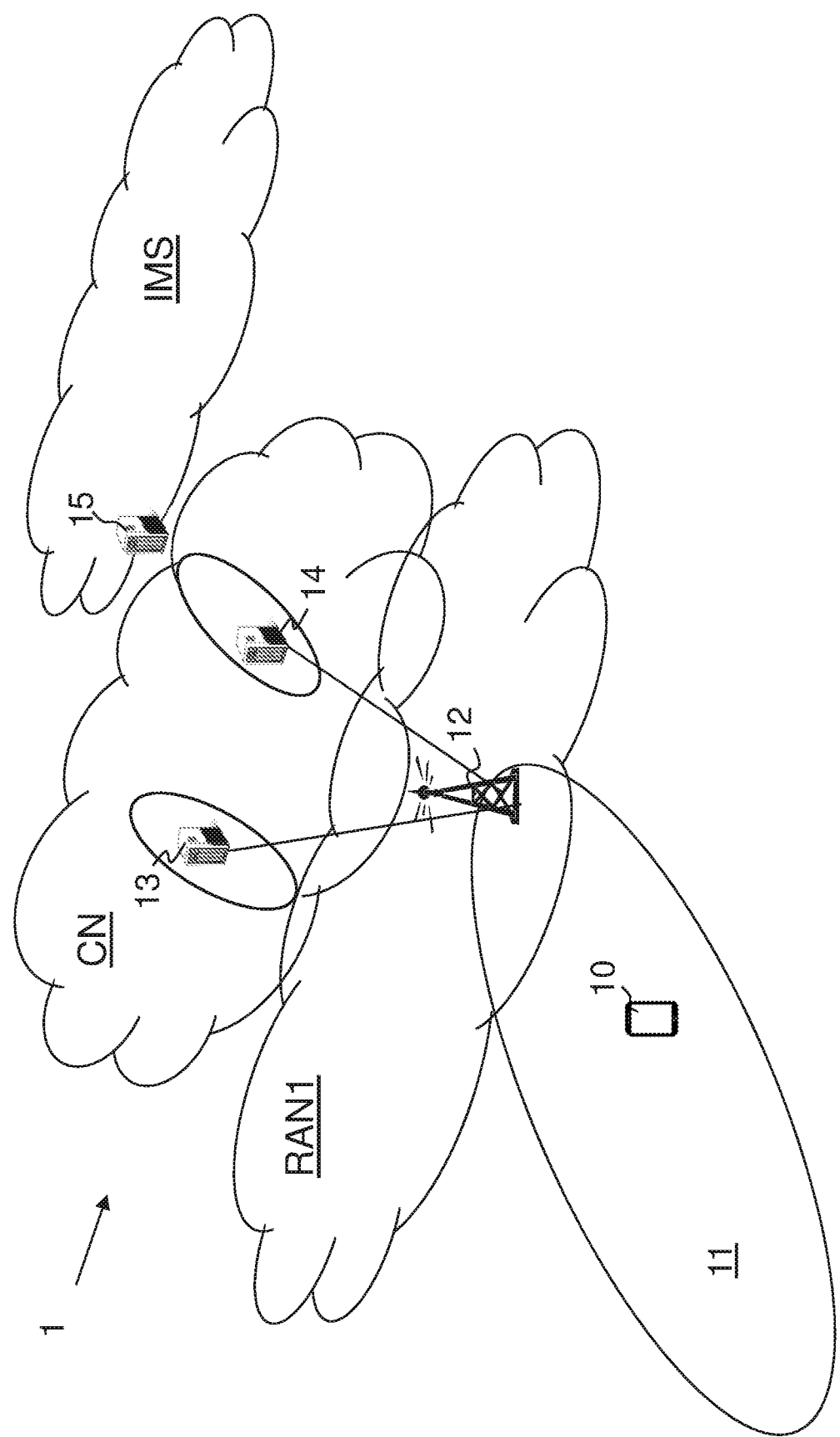
FIG. 4 is a schematic overview depicting a communication network according to embodiments herein.

Embodiments herein relate to communication networks in general. FIG. 4 is a schematic overview depicting a communication network 1. The communication network 1 comprises one or more RANs e.g. a first RAN (RAN1), connected to one or more CNs. The communication network 1 may use a number of different technologies, such as Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. 3G and LTE.

In the communication network 1, UEs e.g. a UE 10 such as a mobile station, a non-access point (non-AP) STA, a STA, a wireless device and/or a wireless terminal, are connected via the one or more RANs, to the one or more CNs. It should be understood by those skilled in the art that "UE" is a non-limiting term which means any terminal, wireless communication terminal, user equipment, Machine Type Communication (MTC) device, Internet of Things operable device, Device to Device (D2D) terminal, mobile device e.g. smart phone, laptop, mobile phone, sensor, relay, mobile tablets or any device communicating within a cell or service area.

The communication network 1 comprises a first radio network node 12 providing radio coverage over a geographical area, a first service area 11, of a first radio access technology (RAT), such as New Radio (NR), LTE, UMTS, Wi-Fi or similar. The first radio network node 12 may be a radio access network node such as radio network controller or an access point such as a wireless local area network (WLAN) access point or an Access Point Station (AP STA), an access controller, a base station, e.g. a radio base station such as a NodeB, an evolved Node B (eNB, eNodeB), a gNodeB, a base transceiver station, Access Point Base Station, base station router, a transmission arrangement of a radio base station, a stand-alone access point or any other network unit capable of serving a UE within the service area served by the first radio network node 12 depending e.g. on the first radio access technology and terminology used. The communication network is virtually network sliced into a number of network slices, each network slice supports one or more type of services i.e. each network slice supports a different set of functionalities. Network slicing introduces the possibility that the network slices are used for different services and use cases and these services and use cases may introduce differences in the functionality supported in the different network slices. Each network slice may comprise one or more network nodes or elements of network nodes providing the services/functionalities for the respective network slice. Each network slice may comprise a network node such as a RAN node and/or a core network node e.g. Radio Software Defined Networking (SDN) nodes, MMEs, S-GWs, Serving GPRS Support Nodes (SGSN), or corresponding nodes in e.g. a 5G network or similar. The GPRS meaning General Packet Radio Services. For example, a first network slice for e.g. MBB services may comprise a first core network node 13 of the CN. A second network slice for e.g. a critical service may comprise a second core network node 14 of the CN. Each network slice supports a set of functionalities out of a total set of functionalities in the communication network. E.g. the first network slice node 13 supports a first set of functionalities out of the total set of functionalities in the communication network 1. The first set of functionalities may be separated from a different set of functionalities out of the total set of functionalities in the communication network 1. E.g. the first set of functionalities being associated with MBB services is separated or logically separated, e.g. using separated data storage or processing resources, from a second set of functionalities of the second network slice.

The first set of functionalities may use one or more resources in a core or RAN network of the communication network, which one or more resources are separated from other resources used by a different set of functionalities, i.e. different network slices, out of the total set of functionalities in the communication network 1. The resources may then be dedicated or virtually dedicated for each set of functionalities or network slice. Thus, the core network node may be separated from other core network nodes supporting a second set of functionalities out of the total set of functionalities in the communication network. Separated meaning herein physically separated wherein the core network nodes may be executed on different hardware platforms and therefore using different resources of the hardware, and/or logically separated wherein the core network nodes may be executed on a same hardware platform and use different resources such as memory parts or resources of processor capacity but may also use some same resources of the hardware e.g. a single physical core network node may be partitioned into multiple virtual core network nodes.

Hence, the first core network node 13 supports the first set of functionalities out of the total set of functionalities in the first core network of the communication network, which first set of functionalities belongs to the first network slice, and is separated from another set of functionalities out of the total set of functionalities in the communication network. The second set of functionalities out of a total set of functionalities in the communication network may be different or similar as ones supported by the first network slice. The UE 10 in this example supports both the first and second network slice. Embodiments herein provide "slice support information" for different services and same UE leading to an efficient use of the UE.

The communication network 1 provides IMS services, such as voice over LTE (VoLTE) or similar, and comprises an IMS node 15 of an IMS. The IMS node may be a Call Session Control Function (CSCF) node such as a serving-CSCF (S-CSCF) node. The IMS network may comprise a Call Session Control Function (CSCF) node and a Home Subscriber Server (HSS). The Call session control function e.g. facilitates session Internet protocol (SIP) setup and teardown and the HSS plays the role of a location server in IMS, in addition to acting as an authentication, authorization, accounting (AAA) server. The CSCF may comprise a number of distributed functions e.g. a proxy CSCF node (P-CSCF), an Interrogating CSCF (I-CSCF) node, and a Serving CSCF (S-CSCF) node. The P-CSCF acts as the entry point in the IMS network. All UE's in the IMS are attached to the Proxy CSCF. The P-CSCF is responsible for routing incoming SIP messages to the IMS registrar server. The P-CSCF is also responsible for setting up IPSec Security associations with the UEs, thus ensuring secure access to the IMS. The I-CSCF node acts as an inbound SIP proxy server in the IMS. During IMS registrations, the I-CSCF queries the HSS to select the appropriate S-CSCF which can serve the UE. During IMS sessions, the I-CSCF acts as the entry point to terminating session requests. The I-CSCF routes the incoming session requests to the S-CSCF of the called party. The S-CSCF node acts as a registrar server, and in some cases as a redirect server. The S-CSCF node facilitates the routing path for mobile originated or mobile terminated session requests. The S-CSCF node is the most processing intensive node of the IMS core network due to its initial filter criteria processing logic which enables IMS service control. The IMS node 15 may in some embodiments be an S-CSCF node.

An advantage according to embodiments herein is that the UE 10 can have many IMS services registered simultaneously in parallel over different 5G packet core network slices which all can use the same secure AKA based authentication method. This enables an operator to let different IMS services traverse different 5GC slices without lowering the security aspects such as would have been the case if for example one registration only could use AKA and the other would use a less secure mechanism such as Digest (user ID, password).

Figure 5:
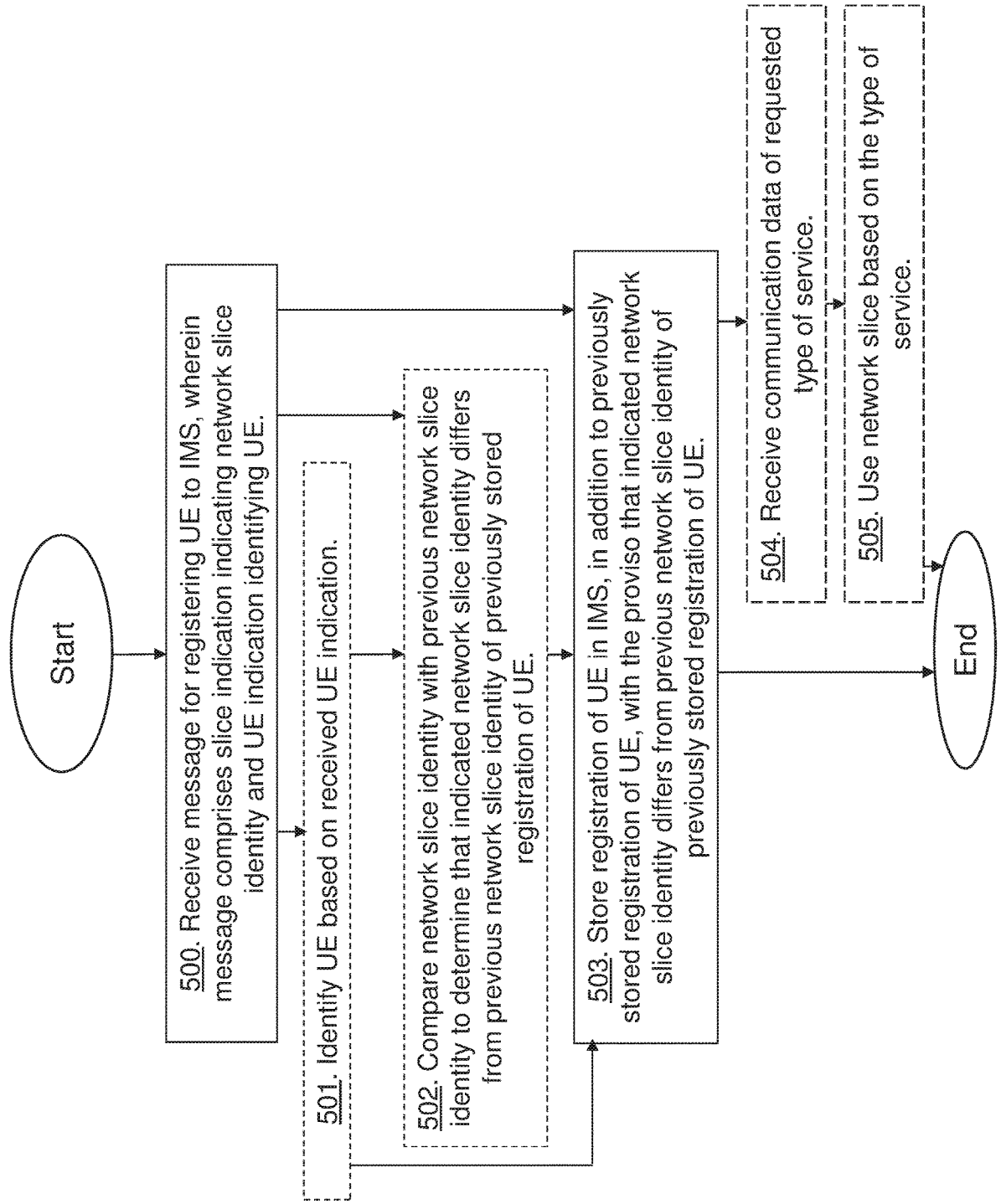
FIG. 5 is a schematic overview depicting embodiments herein.

Example embodiments of a method performed by the IMS node 15 for handling data of the UE 10 in the communication network 1 will now be described with reference to a flowchart depicted in FIG. 5. The communication network 1 comprises partitioned sets of functionalities of one or more core networks wherein each set of functionalities belongs to a network slice. The method comprises the following actions, which actions may be taken in any suitable order. Actions that are optional are presented in dashed boxes in FIG. 5.

Action 500. When the UE 10 wants to register different IMS services over different 5GC network slices, the UE 10 makes a registration for each IMS service. E.g. the UE 10 may initiate a VoLTE service over the first network slice and also initiate another IMS packet communication service over the second network slice. To enable parallel active communication of different IMS services for the UE 10 the IMS network needs to ensure that the registration does not overwrite a previously stored registration of the UE 10. Examples of IMS services are e.g. messaging, voice and video sessions, push to talk, presence and multiplayer games. When the UE 10 registers to an IMS service the UE 10 communicates with the IMS node 15 using messages. One example of such a message is a SIP register message. The IMS node 15 may be an IMS network node such as an S-CSCF node. According to an example scenario, the IMS node 15 receives a message, such as a SIP Register message, for registering the UE 10 to the IMS of the IMS node 15, e.g. for using an IMS service. The message comprises a slice indication indicating a network slice identity, e.g. a slice ID value, and a UE indication identifying the UE 10. The UE indication may comprise a UE identity such as an IP multimedia private identity (IMPI), an international mobile subscriber identity (IMSI) and/or an IP multimedia public identity (IMPU). It should here be noted that the slice indication in the message may be added by the UE 10 or it may be fetched by a P-CSCF node and then added to the message. This may be performed to ensure that the slice indication is a correct slice indication.

Action 501. In some embodiments the IMS node 15 then identifies the UE 10 based on the received UE indication, e.g. by checking the received IMPI, IMSI and/or IMPU.

Action 502. In some embodiments, the IMS node 15 then compares the network slice identity with a previous network slice identity to determine that the indicated network slice identity differs from the previous network slice identity of a previously stored registration of the UE 10.

Action 503. According to the example scenario, if the network slice identity in the received message differs from the previous network slice identity this indicates that the registration is made over a different network slice than the previous registration. The IMS node 15 then stores the registration of the UE 10 in the IMS node 15, in addition to the previously stored registration of the UE 10. Hence, the IMS node 15 thereby allows parallel active communication using the registration and the previously stored registration. This will be described more in detail below.

Action 504. In an example scenario, the message received may further comprise a service indication indicating a type of service. Furthermore, the previously stored registration of the UE 10 may further comprise a previous service indication indicating a previous type of service being different than the indicated type of service of the service indication in the message. The stored registration of the UE 10 may thus further comprise the service indication. Thus, the message received by the IMS node 15 for registering the UE 10 to the IMS, wherein the message comprises the slice indication, the UE indication and may further comprise the service indication indicating the type of service. The IMS node 10 may then receive communication data of a requested type of service of the UE 10, from e.g. an application server, another network node or similar.

Action 505. The IMS node 15 then uses a network slice for communication based on the stored registration or the previously stored registration of the UE 10 based on the requested type of service. E.g. the IMS node 15 compare the requested type of service with type of services of the stored registrations of the UE and from the registrations the network slice of the type of service matching to the requested type of service is selected and used for performing the service.

Figure 6:
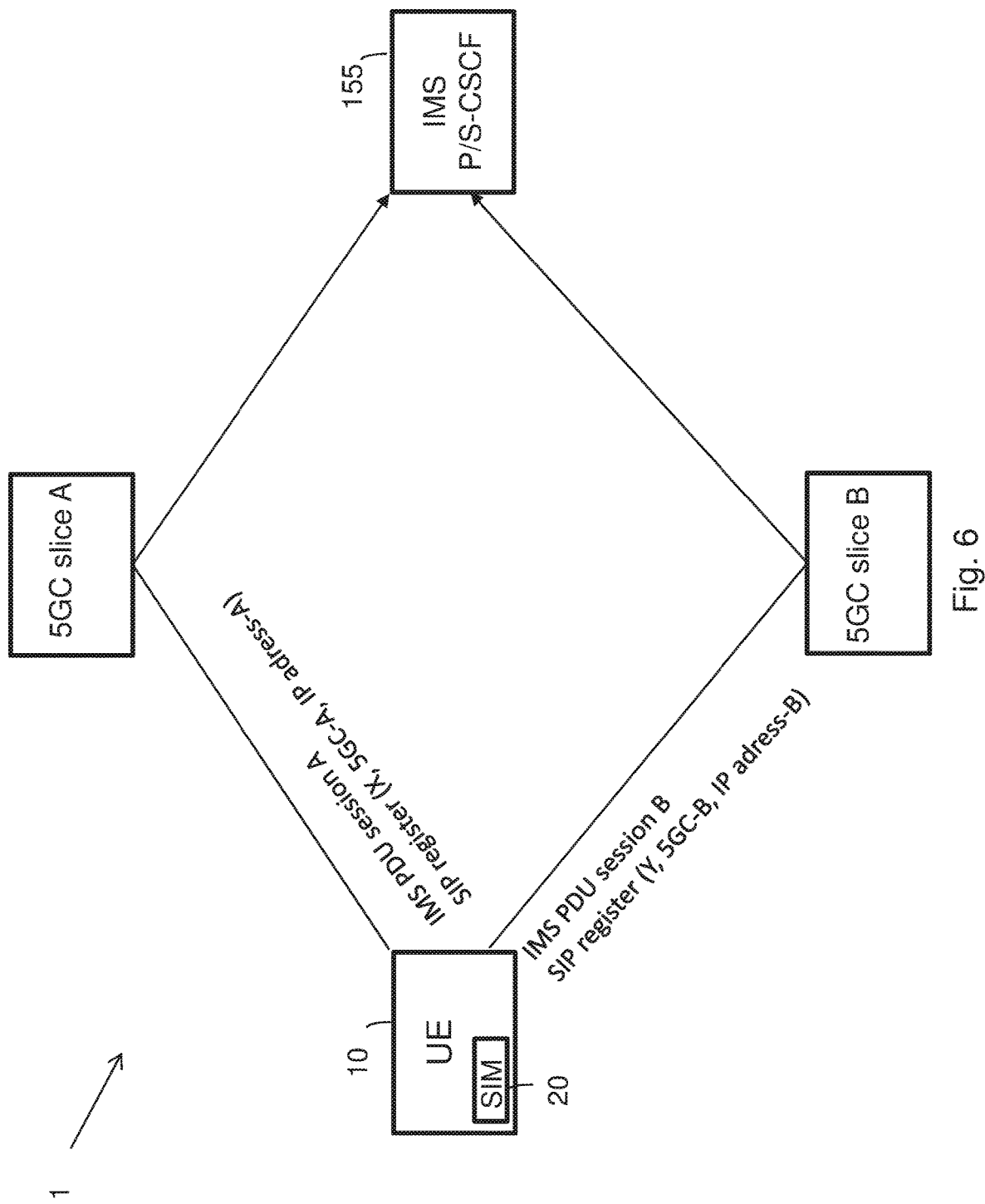
FIG. 6 is a combined flowchart and signalling scheme according to embodiments herein.

According to some embodiments herein, FIG. 6 shows a communication network 1, such as 5GC, with a UE 10 having a subscriber identity module (SIM) card 20 with a private identity, such as an IMSI, and a shared authentication secret stored which is used to calculate a response upon an AKA based authentication challenge. The UE 10 may at power up for instance send two SIP registrations simultaneously. According to embodiments herein, the IMS node 15, which may be an IMS network node such as an S-CSCF node 155, receives, over the communications network 1, e.g. 5GC, a message, such as a SIP register message. The message comprises the slice indication indicating the network slice identity, i.e. 5GC slice information, and the UE indication identifying the UE 10, and e.g. a UE 10 contact IP address. The S-CSCF node 155 may thus receive a second SIP registration before a first registration is completed e.g. in the middle of a startup authentication process. The S-CSCF node 155 may then handle them in parallel until both are successfully registered.

The S-CSCF node 155 checks the UE 10 contact IP address and 5GC slice information. If the 5GC slice information indicates that this registration is made over a different 5GC slice than a previous received SIP register for the UE 10, the S-CSCF node stores the data of the message such as the 5GC slice information, and the UE 10 contact IP address. Hence the S-CSCF node 155 now has two contacts, one associated with a 5GC slice A-IP address and one with a 5GC slice B-IP address. The S-CSCF node 155 performs an authentication procedure e.g. AKA based authentication procedure with the UE 10 over the new 5GC slice. But if the 5GC slice information indicates that this registration is made over the same 5GC slice as an already registered contact, the S-CSCF node 155 replaces the old registration with the new registration. The S-CSCF node 155 performs an AKA based authentication procedure with the UE 10 over the old 5GC slice. The UE 10 has then two or more IMS services which operate over different 5GC slices. The UE 10 knows that service x operates over 5GC slice A and that service y operates over 5GC slice B. E.g. the UE 10 knows this either by a UE Routing Selection Profile (URSP), or simply by being pre-configured with a behavior that for IMS service-x, 5GC slice A shall be used and for all other IMS services, 5GC slide B shall be used. Data transmissions to and from the UE 10 of each service will thus be performed over different 5GC slices.

Figure 7:
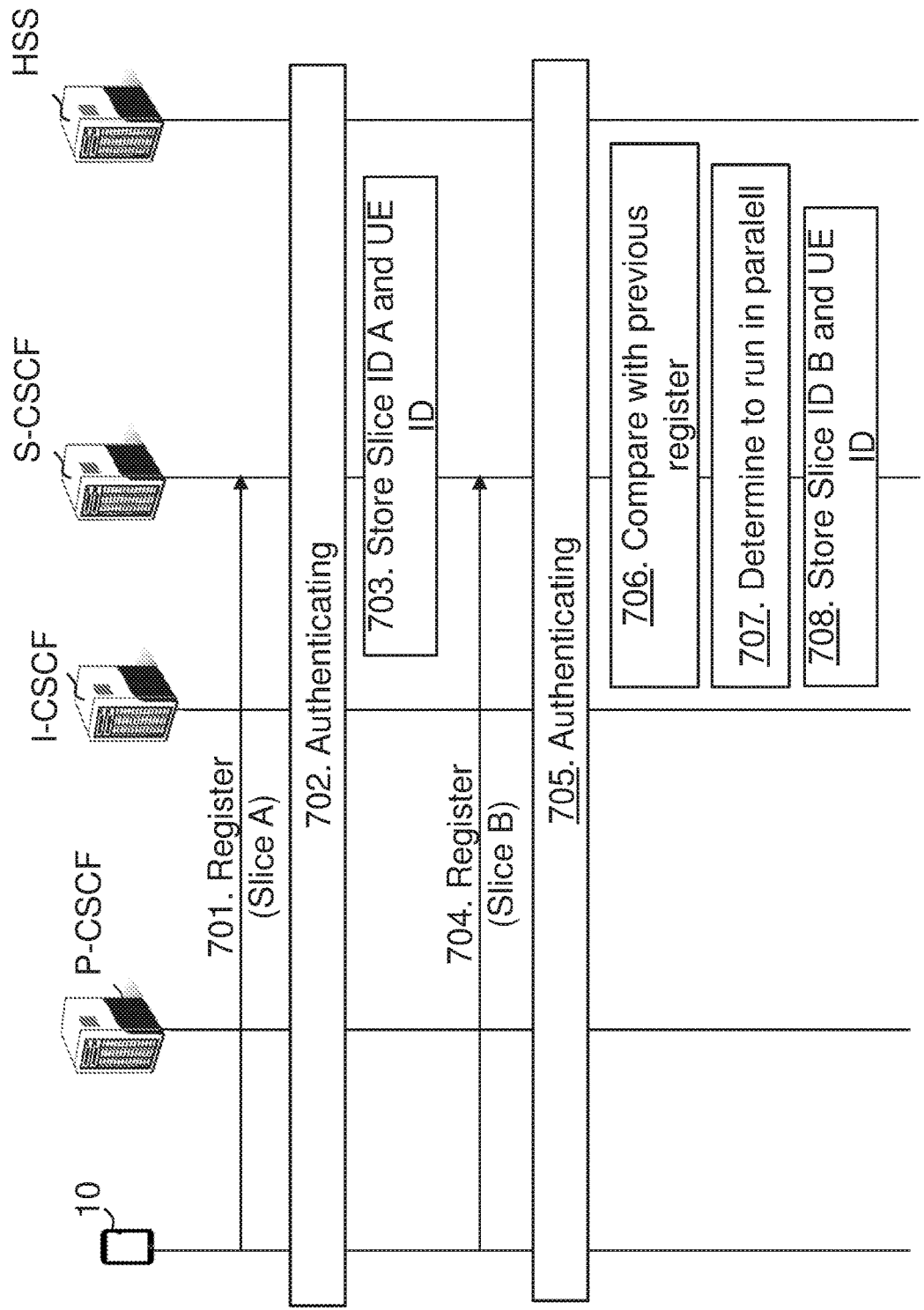
FIG. 7 is a schematic flowchart depicting a method performed by an IMS node according to embodiments herein.

FIG. 7 is a combined flowchart and signalling scheme according to some embodiments herein. Upon power up, the UE 10 wants to register to an IMS in the communication network 1, e.g. 5GC, for e.g. two services X and Y. An I-CSCF node, as shown in FIG. 7, may act as an inbound SIP proxy server in the IMS. During IMS registrations, the I-CSCF node queries a Home Subscriber Server (HSS), i.e. a location server in the IMS, to select the appropriate S-CSCF node, which may serve the UE 10. During IMS sessions, the I-CSCF node may act as an entry point to terminating session requests. The I-CSCF routes incoming session requests to the S-CSCF node of the called party.

Action 701. The IMS node 15 exemplified herein as the S-CSCF node thus receives a first message, such as a first SIP register message, for registering the UE 10 to the IMS of the IMS node 15. The message comprises a slice indication indicating a network slice identity A and a UE indication. The UE obtains an IMS network node P-CSCF IP address which is used as destination for the SIP register messages over the PDU sessions. In conjunction with the PDU session A set up, the UE 10 obtains an IP address A and an IMS P-CSCF IP address, where the latter IMS P-CSCF IP address is used as destination for the first message over PDU session A. The first message may thus comprise: a service identifier, x; a slice indication, such as a slice ID e.g. a 5GC slice A identifier; and the UE indication e.g. IMSI, and also e.g. contact address of the UE, e.g. IP address A, which is a network slice contact address. The UE indication may by an IMSI and/or the message may comprise an IMPI and IMPU, for example derived from the IMSI within the SIM card 20 in the UE 10.

The P-CSCF node receives the message for registering the UE 10 and forwards the message to the S-CSCF node.

Action 702. The S-CSCF node may then perform an authentication procedure such as an AKA procedure over the communication network for registering the UE 10 to the IMS. Thus, the S-CSCF node may send an authentication challenge to the UE 10.

Action 703. If response from the UE is approved, the S-CSCF node stores a $1^{st}$ registration, also referred to as first contact. Hereafter, the S-CSCF node will route any terminating SIP request for service x, over 5GC A using the contact IP address A. The IMS node 15 thus stores the $1^{st}$ registration of the UE comprising the UE ID and the network slice ID A and also service type x.

Action 704. In conjunction with the PDU session B set up, the UE 10 obtains an IP address B and an IMS P-CSCF IP address. The latter IMS P-CSCF IP address is used as destination for a second message, such as second SIP register message over PDU session B. Said second message contains a service identifier y, a slice indication Slice B such as a 5GC slice B identifier and the UE indication e.g. IMSI, and also e.g. contact address (IP address B). The second message sent by the UE 10 may contain the same IMPI and IMPU as the previous SIP register over 5GC slice A. The P-CSCF node forwards the second message to the same S-CSCF node as the previous SIP register over 5GC slice A. The S-CSCF node may thus further receive the second message, such as the second SIP register message, for registering the UE 10 to the IMS of the S-CSCF node for a different service e.g. y and/or over a different network slice e.g. B.

Action 705. The S-CSCF node may then perform an authentication procedure such as an AKA procedure over the communication network for registering the UE to the IMS. This may be part of the registration process thus performed before UE registration data can be stored or used to check if this registration of the UE can be added as an additional registration, i.e. new slice, or if it should overwrite an existing registration of the UE associated with an existing slice.

Action 706. The S-CSCF node may identify the UE 10 based on the UE indication. The network slice identity is then compared with the previously stored network slice identity of the $1^{st}$ registration.

Action 707. If the indicated network slice identity differs from the previous network slice identity of the previously stored registration of the UE 10 the S-CSCF node determines to run the services in parallel. The S-CSCF node may e.g. find that the contact address B belongs to another 5GC slice (B). S-CSCF node therefore understands, since the slice indications differ, that the UE 10 has not gotten a new IP address from its current 5GC slice A that would replace the previous stored contact, but has rather obtained a new IP address from a new 5GC slice B. Hence this is a SIP registration that the UE 10 wants to have in parallel with the first registration for a different service purpose (service y). If the S-CSCF node does not trust the UE 10 provided 5GC slice-B information within the SIP Register message, it may request a network provided 5GC slice information from a Policy Control Function (PCF) within the 5GC-B.

Action 708. Thus, if the indicated network slice identity differs from the previous network slice identity of the previously stored registration of the UE 10, the S-CSCF node stores a $2^{nd}$ registration of the UE 10. Therefore, the S-CSCF node stores this new contact B instead of overwriting the previous one already registered, however first after a successful authentication challenge towards the UE 10.

The UE 10 then establishes an IMS PDU session over 5GC slice A and another IMS PDU session over 5GC slice B and thereby allows parallel active communication using the registration and the previously stored registration.

As a result of the above procedures, the IMS node 15, i.e. the S-CSCF node, has stored two contacts due to multiple UE 10 initiated SIP registrations, each using an authentication mechanism based on the same UE identity and e.g. same secret key, about 128 bits long to avoid duplication of the UE ID, stored in a SIM card of the UE 10, but with different 5GC slice identities and service types.

Figure 8:
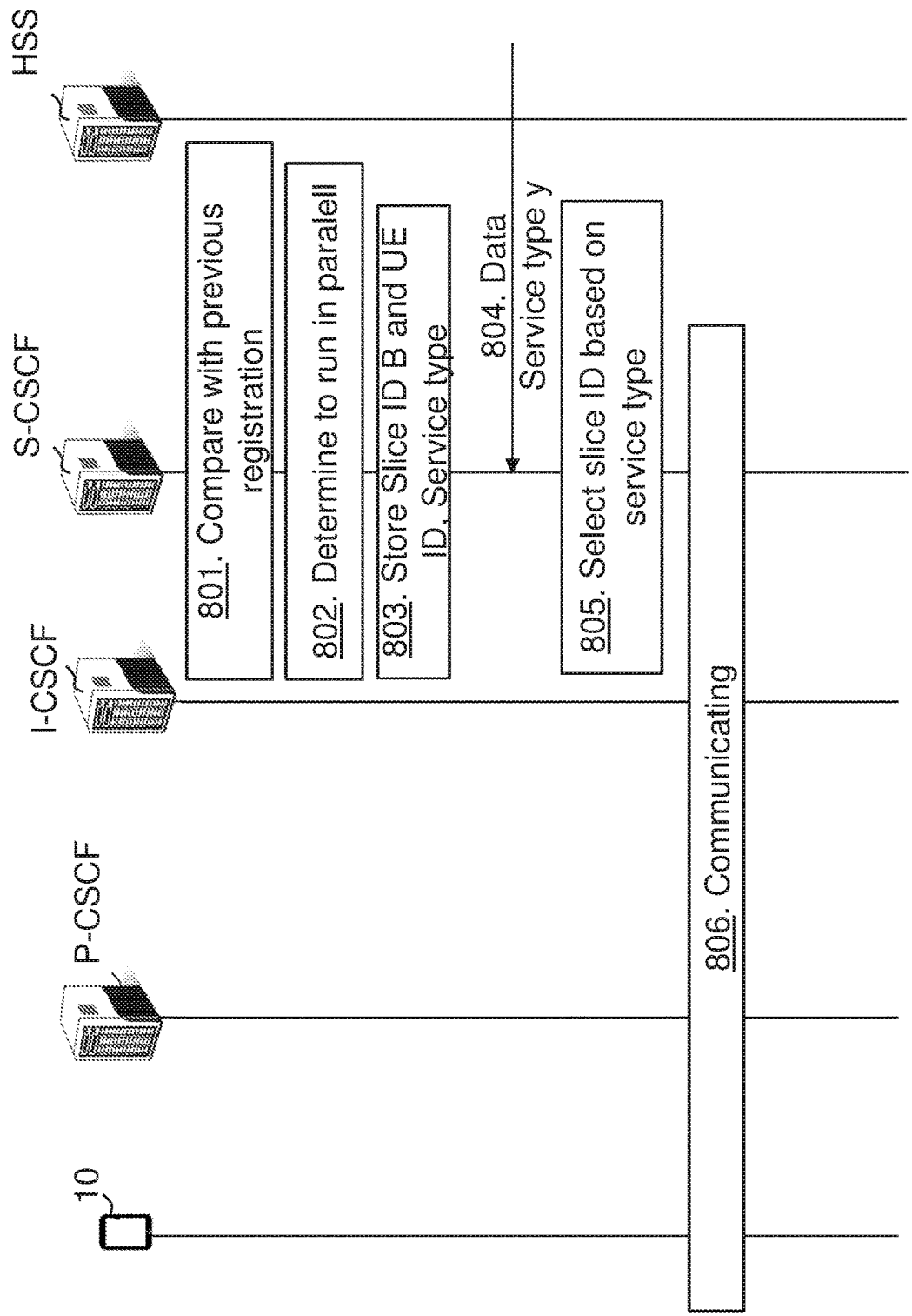
FIG. 8 is a schematic flowchart depicting a method performed by an IMS node according to embodiments herein.

FIG. 8 is a combined flowchart and signalling scheme according to some embodiments herein.

Action 801. As stated above, the IMS node 15, also here exemplified as a S-CSCF node, may identify the UE 10 based on the UE indication of the second message and compare with the previously stored network slice identity of the $1^{st}$ registration with the network slice identity of the second message.

Action 802. If the indicated network slice identity differs from the previous network slice identity of the previously stored registration of the UE 10 the S-CSCF node determines to run the services in parallel.

Action 803. Thus, if the indicated network slice identity differs from the previous network slice identity of the previously stored registration of the UE 10, the S-CSCF node stores the $2^{nd}$ registration of the UE 10. As a result of the above procedures, the S-CSCF node has stored two contacts due to multiple UE 10 initiated SIP registrations, each using an authentication mechanism based on the same UE identity but with different 5GC slice info and for different service types.

Action 804. The S-CSCF node may then receive data of the second service type y.

Action 805. The S-CSCF node determines or selects network slice identity based on the requested service type.

Action 806. In case the data relates to the second service y the S-CSCF node communicates the data over the second network slice B. Thus, the S-CSCF node will route any terminating SIP request for service y, over 5GC B using the contact IP address B, and any SIP request for service x over 5GC A using the contact IP address A.

Figure 9:
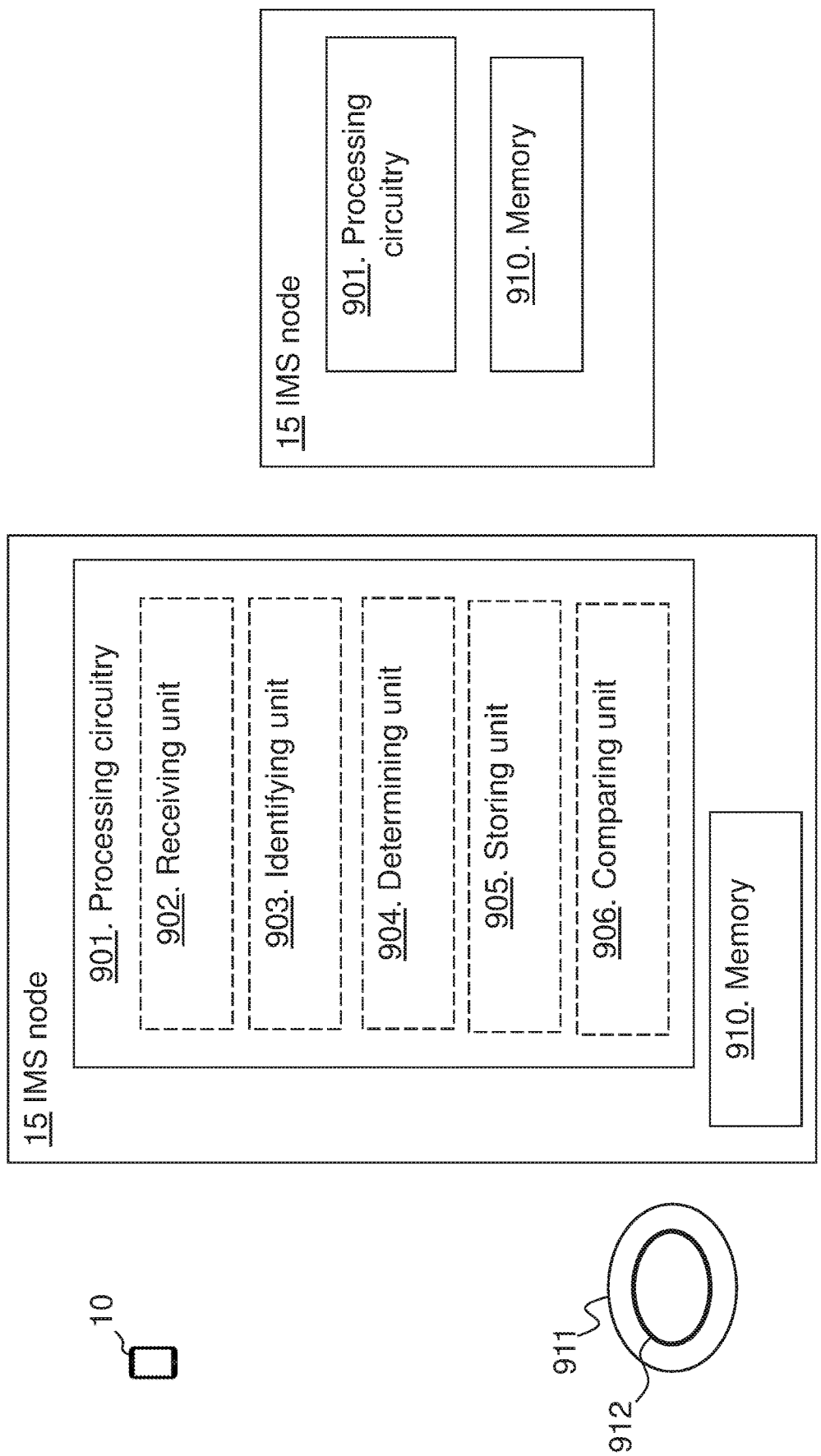
FIG. 9 is a block diagram depicting an IMS node according to embodiments herein.

The block diagram in FIG. 9 illustrates a detailed but non-limiting example of how two embodiments of the IMS node 15 may be structured to bring about the above described solution and embodiments thereof. In FIG. 9, the IMS node 15, such as an S-CSCF node, may be configured to operate according to any of the examples and embodiments of employing the solution as described herein, where appropriate. The IMS node 15 is shown to comprise a processing circuitry 901, e.g. one or more processors, configured to perform the methods herein.

The IMS node 15 is, e.g. by means of units, modules or the like, configured or arranged to perform at least some of the actions of the flow chart in FIG. 5 as follows.

The IMS node 15 is arranged to handle data of the UE 10, which IMS node 15 operates in the communication network 1. The communication network 1 comprises partitioned sets of functionalities of one or more core networks wherein each set of functionalities belongs to a network slice. The IMS node 15 is configured to receive, from the UE 10, the message for registering the UE 10 to the IMS node 15, wherein the message comprises the slice indication indicating the network slice identity and the UE indication identifying the UE 10. This operation may be performed by a receiving unit 902 in the IMS node 15.

The IMS node 15 may also be configured to identify the UE 10 based on the received UE indication. This operation may be performed by an identifying unit 903 or the processing circuitry 901.

The IMS node 15 may further be configured to compare the network slice identity with the previous network slice identity to determine that the indicated network slice identity differs from the previous network slice identity of the previously stored registration of the UE 10. This operation may be performed by a determining unit 904 in the IMS node 15 or the processing circuitry 901.

The IMS node 15 is also configured to store the registration of the UE 10 in the IMS node 15, in addition to the previously stored registration of the UE 10, with the proviso that the indicated network slice identity differs from the previous network slice identity of the previously stored registration of the UE 10 and thereby allowing parallel active communications using the registration and the previously stored registration. This operation may be performed by a storing unit 905 or the processing circuitry 901.

The IMS node 15 may further be configured to receive communication data of a requested type of service of the UE 10. This operation may be performed by the receiving unit 902.

The IMS node 15 may further be configured to compare the network slice identity with the previous network slice identity to determine that the indicated network slice identity differs from the previous network slice identity of the previously stored registration of the UE 10. This operation may be performed by a comparing unit 906 or the processing circuitry 901.

The IMS node 15 further comprises a memory 910. The memory comprises one or more units to be used to store data on, such as messages, slice indications, UE indications, UE registrations, applications to perform the methods disclosed herein when being executed, and similar.

The methods according to the embodiments described herein for the IMS node 15 are respectively implemented by means of e.g. a computer program product 912 or a computer program, comprising instructions, i.e., software code portions, which, when executed on at least one processor, cause the at least one processor to carry out the actions described herein, as performed by the IMS node 15. The computer program product 912 may be stored on a computer-readable storage medium 911, e.g. a disc, a universal serial bus (USB) stick, memory or similar. The computer-readable storage medium 911, having stored thereon the computer program product, may comprise the instructions which, when executed on at least one processor, cause the at least one processor to carry out the actions described herein, as performed by the IMS node 15. In some embodiments, the computer-readable storage medium may be a non-transitory computer-readable storage medium or a transitory computer-readable storage medium. Thus, the IMS node 15 may comprise the processing circuitry and the memory, said memory comprising instructions executable by said processing circuitry whereby said IMS node 15 is operative to perform the methods herein.

Embodiments herein relate to a network with network slices i.e. core network with partitioned sets of functionalities where the first core network node 13 supports the first set of functionalities, the second core network node 14 supports the second set of functionalities and the IMS node 15 supports one or more set of functionalities out of the total set of functionalities in the core networks of the communication network 1. The first set of functionalities belongs to the first network slice of the core network, the second set belongs to the second network slice and the third set of functionalities belongs to the third network slice, and are separated from another set of functionalities out of the total set of functionalities in the core networks.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node or UE, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of radio network nodes and UEs will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by an Internet Protocol, IP, multimedia system, IMS node for handling data of a user equipment, UE, in a communication network, wherein the communication network comprises partitioned sets of functionalities of one or more core networks wherein each set of functionalities belongs to a network slice, the method comprising:
   receiving a message for registering the UE to an IMS of the IMS node, wherein the message comprises a slice indication indicating a network slice identity and a UE indication identifying the UE;
   storing a registration of the UE in the IMS node, in addition to a previously stored registration of the UE, with a proviso that the indicated network slice identity differs from a previous network slice identity of the previously stored registration of the UE and thereby allowing parallel active communications using the registration and the previously stored registration;
   identifying the UE based on the received UE indication; and
   comparing the network slice identity with the previous network slice identity to determine that the indicated network slice identity differs from the previous network slice identity of the previously stored registration of the UE.

2. The method according to claim 1, wherein the message further comprises service indication indicating a type of service and the previously stored registration of the UE further comprises a previous service indication indicating a previous type of service being different than the indicated type of service of the service indication, and wherein the stored registration of the UE further comprises the service indication.

3. The method according to claim 2, further comprising:
   receiving communication data of a requested type of service of the UE; and
   using a network slice for communication based on the stored registration or the previously stored registration of the UE based on the requested type of service.

4. The method according to claim 1, wherein the UE indication is one or more of: an IP multimedia private identity, IMPI; an international mobile subscriber identity, IMSI; and an IP multimedia public identity, IMPU.

5. An Internet Protocol, IP, multimedia system, IMS node for handling data of a user equipment, UE, in a communication network, wherein the communication network comprises partitioned sets of functionalities of one or more core networks wherein each set of functionalities belongs to a network slice, wherein the IMS node is configured to:
   receive a message for registering the UE to an IMS of the IMS node, wherein the message comprises a slice indication indicating a network slice identity and a UE indication identifying the UE;
   store a registration of the UE in the IMS node, in addition to a previously stored registration of the UE, with a proviso that the indicated network slice identity differs from a previous network slice identity of the previously stored registration of the UE and thereby allowing parallel active communications using the registration and the previously stored registration;
   identify the UE based on the received UE indication; and
   compare the network slice identity with the previous network slice identity to determine that the indicated network slice identity differs from the previous network slice identity of the previously stored registration of the UE.

6. The IMS node according to claim 5, wherein the message further comprises service indication indicating a type of service and the previously stored registration of the UE further comprises a previous service indication indicating a previous type of service being different than the indicated type of service of the service indication, and wherein the stored registration of the UE further comprises the service indication.

7. The IMS node according to claim 6, further being configured to:
   receive communication data of a requested type of service of the UE; and to
   use a network slice for communication based on the stored registration or the previously stored registration of the UE based on the requested type of service.

8. The IMS node according to claim 5, wherein the UE indication is one or more of: an IP multimedia private identity, IMPI; an international mobile subscriber identity, IMSI; and an IP multimedia public identity, IMPU.

9. A non-transitory computer-readable storage medium, having stored thereon a computer program comprising instructions which, when executed on at least one processor, cause the at least one processor to:
   receive a message for registering a User Equipment, UE, to an Internet Protocol, IP, multimedia system, IMS, of an IMS node, wherein the message comprises a slice indication indicating a network slice identity and a UE indication identifying the UE;
   store a registration of the UE in the IMS node, in addition to a previously stored registration of the UE, with a proviso that the indicated network slice identity differs from a previous network slice identity of the previously stored registration of the UE and thereby allowing parallel active communications using the registration and the previously stored registration;
   identify the UE based on the received UE indication; and
   compare the network slice identity with the previous network slice identity to determine that the indicated network slice identity differs from the previous network slice identity of the previously stored registration of the UE.

10. The IMS node according to claim 9, wherein the message further comprises service indication indicating a type of service and the previously stored registration of the UE further comprises a previous service indication indicating a previous type of service being different than the indicated type of service of the service indication, and wherein the stored registration of the UE further comprises the service indication.

11. The IMS node according to claim 10, further being configured to:

receive communication data of a requested type of service of the UE; and to use a network slice for communication based on the stored registration or the previously stored registration of the UE based on the requested type of service.

12. The IMS node according to claim 9, wherein the UE indication is one or more of: an IP multimedia private identity, IMPI; an international mobile subscriber identity, IMSI; and an IP multimedia public identity, IMPU.

* * * * *